United States Patent Office 3,701,718
Patented Oct. 31, 1972

3,701,718
HIGH-POROUS ACTIVATED ALUMINA AND METHOD
Denis Papee, Paris, and Michel Lavalou, Saint-Gratien, France, assignors to Produits Chimiques Pechiney-Saint-Gobain, Neuilly-sur-Seine, France
No Drawing. Continuation-in-part of abandoned application Ser. No. 410,315, Nov. 10, 1964. This application Sept. 29, 1969, Ser. No. 862,090
Int. Cl. B01j *11/32;* C01f *7/02, 7/44*
U.S. Cl. 23—141                                         12 Claims

ABSTRACT OF THE DISCLOSURE

This invention is addressed to the preparation of agglomerates of activated alumina having a high degree of porosity and mechanical strength and in which the porous volume is within the range of 50–100 cm.$^3$/100 grams with a large number of pores having a diameter greater than 0.1 micron in which dehydrated alumina is reduced to a particle size within the range of 1 to 25 microns and impregnated with water, with or without mixture with an organic naphthalene type material and in which the amount of water is limited to an amount which does not exceed the porous volume of the particles by more than 8 percent. The impregnated particles are molded into agglomerates, aged and then reactivated by calcination at elevated temperatures.

---

This application is a continuation-in-part of copending application Ser. No. 410,315, filed Nov. 10, 1964 and entitled "High Porous Activated Alumina and Method," and now abandoned.

This invention relates to agglomerates of activated alumina having a high degree of porosityy and good mechanical strength.

In French Pat. No. 1,077,163, filed Mar. 25, 1963, and in the patent of addition No. 65,167, description is made of the dehydration of alumina hydrates in a hot air stream at a temperature within the range of 150° to 600° C. followed by impregnation with water and molding, by pressure of other means, into agglomerates which are aged and reactivated by calcination at a temperature of several hundred degrees C.

Such activated alumina agglomerates enjoy a wide variety of applications and use, such as support or carrier for catalysts, as an absorbent, etc.

However, in some instances where rapid exchange between the liquids contained in the pores of the agglomerates and the outer half is desired, it is necessary to define more precisely the conditions for obtaining these agglomerates in a manner such that a porosity is obtained in which pores having a diameter below 0.1 micron is superposed with pores having a diameter greater than 0.1 micron. The latter assures rapid exchanges, while the pores of less than 0.1 micron provide the activity of the agglomerates, all of which is obtained without undesirably affecting the mechanical strength properties of these agglomerates.

Thus it is an object of this invention to produce and to provide a mehod for producing porous activated agglomerates of alumina having a high degree of porosity and with a large proportion of the pores being dimensioned to have a diameter greater than 0.1 micron with the remainder being formed substantially of less than 0.1 micron.

The concepts of this invention reside in the discovery that such agglomerates of activated alumina, having a high degree of porosity with a large proportion of the pores having a diameter greater than 0.1 micron, can be secured by impregnation of particles of porous activated alumina obtained by dehydration of alumina hydrates with a hot gaseous stream, but in which a minimum amount of the particles has a dimension less than 1 micron, but in which the size of the particles does not generally exceed about 25 microns, and in which the amount of water used to impregnate the particles is kept to a minimum beyond that needed to fill the pores of the alumina. The impregnated particles are molded into agglomerates, aged and reactivated by calcination at elevated temperature. In a modified procedure, the alumina can be employed in admixture with naphthalene in an amount up to 30 percent by weight of the alumina prior to impregnation. Instead of naphthalene, use can be made of other similar organic materials which are completely eliminated at the high temperatures for reactivation.

The dehydration of alumina hydrates in hot gaseous streams produces pseudo-spherical granules of alumina in which the porosity can vary, such as within the range of 20–35 cm.$^3$/100 grams, depending upon the number of dehydrations and the conditions for dehydration.

Thus the amount of water required to be added will correspond to the porous volume of the alumina plus the amount of water necessary for agglomeration and molding. The amount of water added over and above the amount corresponding to the porous volume of the alumina is critical and must not exceed 8 percent by weight of the alumina.

Reactivation is carried out at temperatures up to 600° C. The resulting product frequently contains amounts of pores having a pore diameter greater than 0.1 micron ranging up to 38 cm.$^3$/100 g.

The following examples are given by way of illustration but not by way of limitation of the practice of this invention. It will be seen that a grinding yielding a minimum of fines and that molding with a small amount of water yields agglomerates having a high degree of porosity in the form of pores dimensioned to be greater than 0.1 micron. The porosity can be increased by combining the grinding and agglomeration steps with the addition of naphthalene to the ground alumina. It will be apparent that changes may be made in the processing steps and conditions without departing from the spirit of the invention. For example, crushing of the dehydrated alumina can be followed by screening for selection of particles of optimum dimension.

EXAMPLE 1

Hydrargillite is processed through a hot gaseous stream (250°–400° C.) to produce a partially dehydrated alumina having a porous volume of 25 cm.$^3$/100 grams and comprising pseudo-spherical granules ranging from 10 to 130 microns. The partially dehydrated alumina is subdivided into two portions, A and B. Portion A is ground in a corindon ball crusher of a 10 mm. diameter with selection of particles by an air current and a cyclone, and particles having a diameter above 30 microns are recycled. Portion B is ground in a ceramic ball grinder 30 mm. in diameter, without recycling, for 10 hours. The particle size distribution is as follows:

| Dimension of particles | Part A | Part B |
|---|---|---|
| <30μ | 99% | 95% |
| <20μ | 90% | 88% |
| <10μ | 55% | 70% |
| <5μ | 27% | 50% |
| <2μ | 6% | 30% |
| Average diameter | 9μ | 5μ |

Agglomeration is effected in a rotary granulator with the addition of different quantities of water to portions A and B. Water is added to portions A and B in amounts corresponding to an excess of 5% by weight, based on the weight of alumina falling within the critical range according to the present invention, and an amount corresponding to an excess of 15% by weight. This latter amount is outside the critical range of the invention, and is the maximum amount which can be used in the granulator and still obtain coherent granules. Balls are formed having dimensions in the range of 2 to 5 mm., and are stored for several days in sealed containers. Thereafter, they are dried in an oven at 100° C. and reactivated by heating in a hot gaseous stream for two hours at 400° C. The porous volume of the pores having a diameter greater than 0.1 micron is measured as well as the total porous volume. The results are set forth in the following table.

| Grinding | Volume of pores having diameter >0.1μ (cm.³/100 g.) | Total porous vol. (cm.³/100 g.) | Excess water, percent by weight |
| --- | --- | --- | --- |
| A | 22 | 62 | 5 |
| A | 11 | 46 | 15 |
| B | 5 | 42 | 5 |
| B | 0 | 35 | 15 |

It will be seen from the foregoing that the balls having the highest degree of porosity, a porosity of 62 in the case of grinding A with excess water of 5%, are secured from the particles having the larger size and to which the lesser amount of water is added.

EXAMPLE 2

Hydrargillite from a Bayer process is activated in a hot gaseous stream to produce dehydrated alumina which is substantially free of hydrargillite. The alumina, which has a porous volume of 23 cm.³/100 grams, is ball-milled for one hour. 26 grams of water per 100 grams of alumina is added to the crushed alumina and the impregnated alumina is agglomerated in a rotary granulator to form balls having the size within the range of 2 to 5 mm. After aging at high humidity and at about ambient temperature, drying, and reactivating, as in the preceding example, the balls so treated have a total porous volume of 60 cm.³/100 grams comprising 20 cm.³/100 grams of pores having diameters greater than 0.1 micron and in which the product has a density of 1.07 gram/cm.³.

EXAMPLE 3

Activated alumina is prepared as in Example 2, by dehydrating hydrargillite. This alumina is washed at a pH of about 8 and is again reactivated in the same manner as before. A product having a high porous volume of 35 cm.³/100 grams is obtained with a low yield of Na₂O of 0.06%. The product is crushed in a continuous mill to provide particles having the following size distribution.

Particles <—  Percent
20μ _____ 90
5μ _____ 20
1μ _____ 2

40 grams of water is added per 100 grams of the alumina and agglomeration is effected in a rotary granulator to form balls having a size within the range of 2 to 5 mm. After aging, drying and reactivating, as in the processes of Examples 1 and 2, balls are obtained having a total porous volume of 75 cm.³/100 grams of which 25 cm.³/100 grams are pores having diameters greater than 0.1 micron, and the product has a density of 0.93 gram/cm.³.

EXAMPLE 4

Activated alumina obtained by dehydration of alumina hydrates in a hot gaseous stream is crushed in a continuous mill to give the following particle size distribution:

Particles <—  Percent
20μ _____ 85
5μ _____ 18
1μ _____ 2

Then this alumina is kneaded in a ball-mill with naphthalene added in an amount up to 20% by weight of the alumina. The product so obtained is mixed with 30 grams of water per 100 grams of the mixture, and it is extruded into small rods having a diameter of 4 mm. After activation at 600° C. in a hot gaseous current, the rods so treated have a total porous volume of 93 cm.³/100 grams, of which 38 cm.³/100 grams are of a pore diameter greater than 0.1 micron, of which 5 cm.³/100 grams are pores having diameters within the range of 8 to 17 microns, and these rods are characterized by good mechanical strength.

EXAMPLE 5

With the same crushed alumina as in Example 4, a mixture is formed of the alumina with 30% of the weight of naphthalene. Then 24 grams of water is added per 100 grams of mixture and agglomeration is effected in a rotary granulator. After aging, drying, and activating, as in Example 2, balls are obtained having a total porosity of 80 cm.³/100 grams of which 35 cm.³/100 grams are of a pore diameter greater than 0.1 micron, of which 5 cm.³/100 grams are of a pore diameter within the range of 8 to 17 microns.

It will be apparent from the foregoing that there is provided a new and improved process for the consistent production of porous agglomerates of activated alumina having a high degree of porosity such as within the range of 50 to 100 cm.³/100 grams and mechanical strength, and in which a substantial proportion of the pores is of a pore diameter greater than 0.1 micron.

It will be understood that changes may be made in the details of formulation and processing, without departing from the spirit of the invention, especially as defined in the following claims.

We claim:

1. A process for the preparation of agglomerates of activated alumina having a high degree of porosity and mechanical strength including a substantial amount of pores having a diameter greater than 0.1 micron comprising the steps of impregnating porous activated alumina particles obtained by dehydration of alumina hydrate and in which the porous alumina particles have sizes in the range of 1 to 25 microns and in which impregnating is effected with water in an amount which exceeds the porous volume but which does not exceed the porous volume of the particles by more than 8 percent by weight based upon the weight of the alumina, molding the impregnated porous alumina particles, aging the agglomerates so obtained and then reactivating these agglomerates by heating.

2. The process as claimed in claim 1 in which the porous activated alumina is obtained by the step of dehydration of hydrargillite.

3. The process as claimed in claim 1 in which the particles of porous activated alumina have a porosity within the raneg of 20 to 35 cm.³/100 grams.

4. The process as claimed in claim 1 in which the impregnated alumina is molded in a rotary granulator to form balls.

5. The process as claimed in claim 1 in which the impregnated alumina is molded by extrusion to form thin rods.

6. The method as claimed in claim 1 in which the aging step is carried out at relatively high humidity and at about ambient temperature.

7. The process as claimed in claim 1 in which reactivation of the agglomerates of alumina is carried out at a temperature up to 600° C.

8. The process as claimed in claim 1 in which the amount of pores having a pore diameter greater than 0.1 micron ranges up to 38 cm.³/grams.

9. The process as claimed in claim 4 in which the balls are dimensioned to have a size within the range of 2 to 5 mm. in diameter.

10. Activated alumina agglomerates produced by the process of claim 1 having a total porous volume within the range of 50 to 100 cm.$^3$/100 grams of these agglomerates, up to 38 cm.$^3$/100 grams of the porous volume being constituted by pores having a diameter greater than 0.1 micron.

11. Activated alumina agglomerates produced by the process of claim 4 in the form of balls.

12. Activated alumina agglomerates produced by the process of claim 5 in the form of rods.

References Cited

UNITED STATES PATENTS

| 2,881,051 | 4/1959 | Pingarl | 23—143 |
| 2,876,068 | 3/1959 | Tertian et al. | 23—142 |
| 3,264,069 | 8/1966 | Getty | 23—143 X |

OSCAR R. VERTIZ, Primary Examiner

H. S. MILLER, Assistant Examiner

U.S. Cl. X.R.

252—463

UNITED STATES PATENT OFFICE

CERTIFICATE OF CORRECTION

Patent No. 3,701,718            Dated October 31, 1972

Denis Papee and Michel Lavalou

It is certified that errors appear in the above identified patent and that said Letters Patent are hereby corrected as follows:

Column 1, line 9, please insert -- Priority of French application No. 953,378, filed on November 12, 1963. --

Signed and sealed this 29th day of May 1973.

(SEAL)
Attest:

EDWARD M. FLETCHER, JR.           ROBERT GOTTSCHALK
Attesting Officer                Commissioner of Patents